United States Patent
Jiang

(10) Patent No.: US 9,946,417 B2
(45) Date of Patent: Apr. 17, 2018

(54) ARRAY SUBSTRATE, IN-CELL TOUCH SCREEN AND TOUCH DISPLAY DEVICE

(71) Applicants: BOE TECHNOLOGY GROUP CO., LTD., Beijing (CN); CHONGQING BOE OPTOELECTRONICS TECHNOLOGY CO., LTD., Beibei, Chongqing (CN)

(72) Inventor: Rikun Jiang, Beijing (CN)

(73) Assignees: BOE TECHNOLOGY GROUP CO., LTD., Beijing (CN); CHONGQING BOE OPTOELECTRONICS TECHNOLOGY CO., LTD., Beibei, Chongqing (CN)

( * ) Notice: Subject to any disclaimer, the term of this patent is extended or adjusted under 35 U.S.C. 154(b) by 0 days.

(21) Appl. No.: 14/768,347

(22) PCT Filed: Dec. 12, 2014

(86) PCT No.: PCT/CN2014/093737
§ 371 (c)(1),
(2) Date: Aug. 17, 2015

(87) PCT Pub. No.: WO2016/041271
PCT Pub. Date: Mar. 24, 2016

(65) Prior Publication Data
US 2016/0252996 A1    Sep. 1, 2016

(30) Foreign Application Priority Data
Sep. 16, 2014    (CN) .......................... 2014 1 0472784

(51) Int. Cl.
*G06F 3/044*    (2006.01)
*G02F 1/1343*    (2006.01)
*G06F 3/041*    (2006.01)

(52) U.S. Cl.
CPC ........ *G06F 3/044* (2013.01); *G02F 1/134336* (2013.01); *G06F 3/0412* (2013.01); *G06F 3/0418* (2013.01)

(58) Field of Classification Search
CPC .............................. G06F 3/044; G06F 3/0416
See application file for complete search history.

(56) References Cited

U.S. PATENT DOCUMENTS 6,498,592 B1 * 12/2002 Matthies ............. G02F 1/13336
257/E25.032
9,170,692 B2 * 10/2015 Yang .................. G02F 1/134336
(Continued)

FOREIGN PATENT DOCUMENTS

| CN | 102914920 A | 2/2013 |
| CN | 102945106 A | 2/2013 |

(Continued)

OTHER PUBLICATIONS

International Search Report with English translation and Written Opinion both dated Jun. 23, 2015; PCT/CN2014/093737.
(Continued)

Primary Examiner — Patrick F Marinelli
(74) Attorney, Agent, or Firm — Ladas & Parry LLP

(57) ABSTRACT

An array substrate, an in-cell touch screen and a touch display device are provided. The array substrate includes a common electrode layer, wherein the common electrode layer is provided with a plurality of driving electrodes and a plurality of sensing electrodes with extending directions perpendicular to each other, each of the driving electrodes includes a plurality of driving sub-electrodes which are connected to one another, each of the sensing electrodes includes a plurality of sensing sub-electrodes which are connected to one another, and adjacent driving sub-electrode and sensing sub-electrode have concave-convex structures
(Continued)

in a staggered arrangement at an border and are insulated from each other.

17 Claims, 4 Drawing Sheets

(56) References Cited

U.S. PATENT DOCUMENTS

| | | | | |
|---|---|---|---|---|
| 9,442,330 | B2* | 9/2016 | Huo | G02F 1/13338 |
| 2006/0081991 | A1* | 4/2006 | Seta | G06F 17/5077 |
| | | | | 257/758 |
| 2011/0140266 | A1* | 6/2011 | Matsuo | G06F 3/044 |
| | | | | 257/735 |
| 2011/0141037 | A1* | 6/2011 | Hwang | G06F 3/044 |
| | | | | 345/173 |
| 2011/0148826 | A1* | 6/2011 | Koyama | G09G 3/3696 |
| | | | | 345/204 |
| 2011/0233793 | A1* | 9/2011 | Miura | B23K 1/0016 |
| | | | | 257/779 |
| 2012/0127387 | A1* | 5/2012 | Yamato | G06F 3/044 |
| | | | | 349/42 |
| 2012/0274603 | A1* | 11/2012 | Kim | G06F 3/0412 |
| | | | | 345/174 |
| 2014/0043284 | A1* | 2/2014 | Park | G06F 3/044 |
| | | | | 345/174 |
| 2014/0125626 | A1* | 5/2014 | Yang | G02F 1/134336 |
| | | | | 345/174 |
| 2014/0184559 | A1* | 7/2014 | Han | G06F 3/0412 |
| | | | | 345/174 |
| 2014/0198268 | A1* | 7/2014 | Sugita | G06F 3/044 |
| | | | | 349/12 |
| 2014/0333582 | A1* | 11/2014 | Huo | G02F 1/13338 |
| | | | | 345/174 |
| 2015/0029118 | A1 | 1/2015 | Xu et al. | |
| 2015/0220202 | A1* | 8/2015 | Choung | G06F 3/0416 |
| | | | | 345/174 |
| 2015/0253915 | A1* | 9/2015 | Hoang | G06F 3/0412 |
| | | | | 345/173 |
| 2016/0011688 | A1* | 1/2016 | Wang | G06F 3/041 |
| | | | | 345/174 |
| 2016/0048239 | A1* | 2/2016 | Zheng | G06F 3/0412 |
| | | | | 345/174 |
| 2016/0103537 | A1* | 4/2016 | Park | G06F 3/0412 |
| | | | | 345/174 |
| 2016/0179240 | A1* | 6/2016 | Chang | G06F 3/0412 |
| | | | | 345/174 |
| 2016/0246416 | A1* | 8/2016 | Xie | G02F 1/133 |
| 2016/0246427 | A1* | 8/2016 | Ming | G02F 1/1343 |
| 2016/0252996 | A1* | 9/2016 | Jiang | G06F 3/0418 |
| 2016/0291755 | A1* | 10/2016 | Li | G06F 3/0412 |
| 2016/0291781 | A1* | 10/2016 | He | G06F 3/0416 |
| 2016/0299612 | A1* | 10/2016 | Lu | G06F 3/0412 |
| 2016/0370892 | A1* | 12/2016 | Chang | G06F 3/0416 |

FOREIGN PATENT DOCUMENTS

| | | |
|---|---|---|
| CN | 103049155 A | 4/2013 |
| CN | 103150070 A | 6/2013 |
| CN | 103257769 A | 8/2013 |
| CN | 104199586 A | 12/2014 |
| EP | 2930684 A1 | 2/2016 |

OTHER PUBLICATIONS

First Chinese Office Action dated Nov. 4, 2016; Appln. No. 201410472784.8.
The Second Chinese Office Action dated May 9, 2017; Appln. No. 201410472784.8.

* cited by examiner

ARRAY SUBSTRATE, IN-CELL TOUCH SCREEN AND TOUCH DISPLAY DEVICE

TECHNICAL FIELD

Embodiments of the invention relate to an array substrate, an in-cell touch screen and a touch display device.

BACKGROUND

On account of advantages such as accurate and sensitive positioning, good touch feeling, and long service life and the like, capacitive touch screens are more and more popular among manufacturers and users and are applied in many fields. The capacitive touch screens are divided into two types of self-capacitive touch screens and mutual-capacitive touch screens. Due to capability of multi-point touch, the mutual-capacitive touch screens become a mainstream and a future development trend in a capacitive touch screen market.

The mutual-capacitive touch screens are divided into two structures, i.e., an on cell type and an in cell type. In an on-cell mutual-capacitive touch screen (hereinafter referred to as on-cell touch screen), a touch component is attached to an external part of a display panel, specifically to an external part of a color filter substrate, namely On Cell; in an in-cell mutual-capacitive touch screen (also known as in-cell mutual-capacitive touch screen, hereinafter referred to as in-cell touch screen), a touch component is integrated between a color filter substrate and an array substrate, namely In Cell. The on-cell touch screen inevitably increases thickness and weight of the entire display device, thereby reducing light transmittance, which cannot meet requirement of the current development trend on a lighter and thinner display device. The in-cell touch screen has obvious advantages in reducing thickness of the display device and increasing transmittance as the touch component is integrated to an internal part of the display panel, so that a lighter and thinner display device can be achieved while realizing a touch function.

However, compared with the on-cell touch screen, the in-cell touch screen has an unsolved technical difficulty that an electrode layer located inside a display panel is closer to a touch screen electrode, which is easy to cause interference between a touch signal and a display signal, thereby leading to a lower signal to noise ratio of the in-cell touch screen.

SUMMARY OF THE INVENTION

One embodiment of the invention provides an array substrate, comprising a common electrode layer, wherein the common electrode layer is provided with a plurality of driving electrodes and a plurality of sensing electrodes with extending directions perpendicular to each other, each of the driving electrodes includes a plurality of driving sub-electrodes which are connected to one another, each of the sensing electrodes includes a plurality of sensing sub-electrodes which are connected to one another, and adjacent driving sub-electrodes and sensing sub-electrodes have concave-convex structures in a staggered arrangement at borders and are insulated from each other.

In one example, the array substrate further comprises a plurality of sub-pixel units, wherein projections of the borders of the driving sub-electrodes and the sensing sub-electrodes in a direction perpendicular to the array substrate do not go through light-transmissive regions of the sub-pixel units.

In one example, the driving sub-electrode and the sensing sub-electrode are both widened in a stepped manner from end portions to a middle portion in the extending direction of the driving electrode and in the extending direction of the sensing electrode.

In one example, the driving sub-electrode and the sensing sub-electrode have serrated edges, and adjacent serrated edges of the driving sub-electrode and the sensing sub-electrode are arranged in a staggered manner.

In one example, the driving sub-electrode and the sensing sub-electrode are symmetric to each other both in the extending direction of the driving electrode and in the extending direction of the sensing electrode.

In one example, the array substrate further comprises a gate electrode and bridging metals which are in a same layer as the gate electrode and insulated from the gate electrode, wherein, adjacent driving sub-electrodes belonging to a same driving electrode are connected with a bridging metal so as to be conductive to each other; or adjacent sensing sub-electrodes belonging to a same sensing electrode are connected with a bridging metal so as to be conductive to each other.

In one example, the array substrate further comprises: driving metal wires and sensing metal wires, the driving metal wires being arranged below the driving sub-electrodes and being conductive to the driving sub-electrodes, and the sensing metal wires being arranged below the sensing sub-electrodes and being conductive to the sensing sub-electrodes.

In one example, the array substrate further comprises gate lines and data lines, wherein, the driving metal wires are parallel to the gate lines, and the sensing metal wires are parallel to the data lines; or the sensing metal wires are parallel to the gate lines, and the driving metal wires are parallel to the data lines.

In one example, an organic film layer is further arranged on the bridging metals, via holes are further formed in positions of the organic film layer corresponding to the bridging metals, and the bridging metals are conductive to corresponding driving sub-electrodes or sensing sub-electrodes through the via holes.

Another embodiment of the invention further provides an in-cell touch screen, comprising a color filter substrate and the array substrate described above, wherein a black matrix also is further arranged between adjacent sub-pixel units on the color filter substrate, the driving metal wires, the sensing metal wires as well as the borders between the driving sub-electrodes and the sensing sub-electrodes are all corresponding to the black matrix in position.

Still another embodiment of the invention further provides a touch display device comprising the in-cell touch screen described above.

According to the array substrate provided in the embodiments of the invention, the common electrode layer is divided into driving electrodes and sensing electrodes by altering an existing structure of the common electrode layer, and concave-convex structure in a staggered arrangement are formed at borders of adjacent driving sub-electrodes and sensing sub-electrodes to form a mutual nest structure, so as to achieve the purpose of prolonging boundaries between the driving sub-electrodes and the sensing sub-electrodes. Thus, mutual capacitance between the sensing sub-electrodes and the driving sub-electrodes is increased, emission intensity of a touch signal is enhanced, signal to noise ratio of the touch signal is increased, and therefore touch sensitivity is improved.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1:
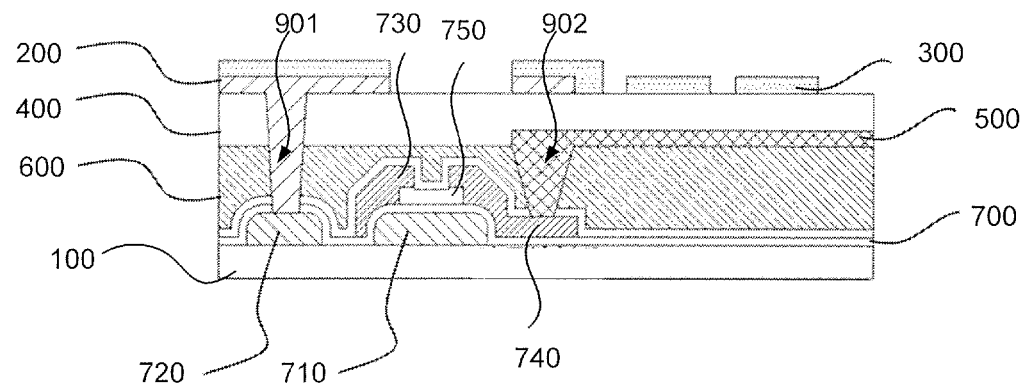
FIG. 1 is a structural schematic diagram of an array substrate provided by a first embodiment of the invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

It should be noted that, in the drawings, dimensions of layers and regions may be magnified in order to ensure a clear graphical representation. It can be understood that when an element or a layer is described as being "on" another element or layer, the element or the layer may be directly on the another element or layer or there may an intermediate layer therebetween. In addition, it can be understood that when an element or a layer is described as being "below" another element or layer, the element or the layer may be directly below the another element or layer or there may be more than one intermediate layers or elements therebetween. In addition, it can be also understood that when an element or a layer is described as being "between" two layers or two elements, the element or the layer may be the only layer between the two layers or the two elements or there may be more than one intermediate layers or elements between the two layers or the two elements. In the invention, like reference signs indicate like elements.

First Embodiment

The embodiment of the invention provides an array substrate as illustrated in FIG. 1. The array substrate comprises a base substrate 100, and a gate electrode 710, a source electrode 730, a drain electrode 740 and a semiconductor layer 750 arranged on the base substrate 100, and further comprises a common electrode layer 300. The common electrode layer 300 is provided with a plurality of driving electrodes and a plurality of sensing electrodes with extending directions perpendicular to each other, wherein each of the driving electrodes includes a plurality of driving sub-electrodes which are connected to one another, each of the sensing electrodes includes a plurality of sensing sub-electrodes which are connected to one another, and adjacent driving sub-electrodes and sensing sub-electrodes have concave-convex structures in a staggered arrangement at borders and insulated from each other.

For example, the driving sub-electrode and the sensing sub-electrode have serrated edges, and adjacent serrated edges of the driving sub-electrode and the sensing sub-electrode are arranged in a staggered manner.

As the common electrode layer 300 and a pixel electrode 500 are arranged on the side of the array substrate, an electrical field parallel to the base substrate 100 and generated between the pixel electrode 500 and the common electrode layer 300 ensures that all liquid crystal molecules between electrodes and above the gate electrode 710 can rotate in a plane direction parallel to the base substrate 100. Further, the common electrode layer 300 is divided and integrated to ensure that adjacent driving sub-electrodes and sensing sub-electrodes form concave-convex structures in a staggered arrangement at the borders, so as to alter a liner structure between driving sub-electrodes and sensing sub-electrodes in the prior art, thus achieving the purpose of prolonging boundaries between the driving sub-electrodes and sensing sub-electrodes, and increasing signal to noise ratio.

Figure 2:
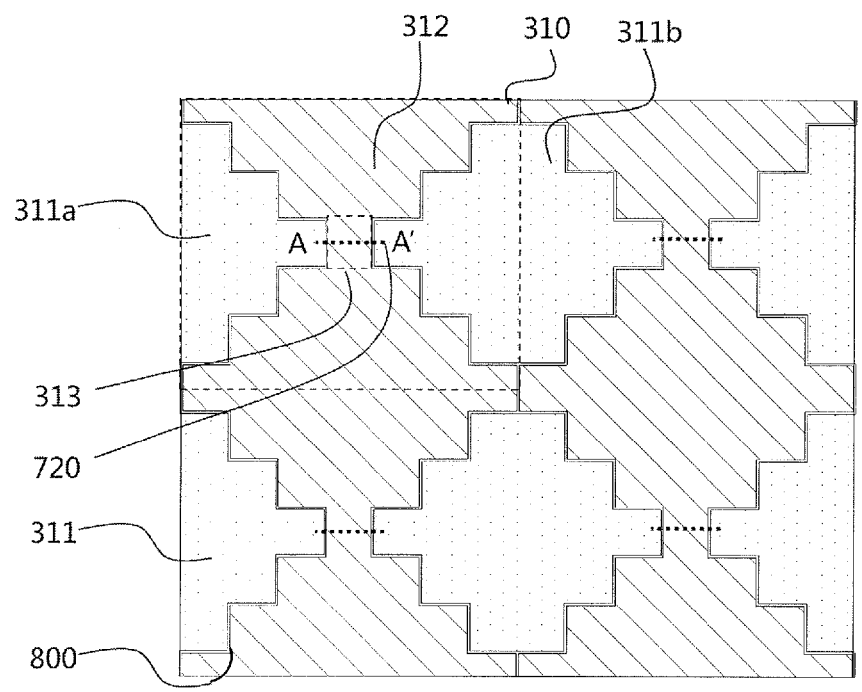
FIG. 2 is a schematic diagram of a touch pattern obtained by dividing the common electrode layer according to the first embodiment of the invention.

Optionally, the array substrate further comprises a plurality of sub-pixel units. For example, each of the sub-pixel units described herein is a minimum unit for display. For example, the plurality of sub-pixel units are sequentially arranged in a row direction and in a column direction to form a matrix. Projections of the borders of the driving sub-electrodes and the sensing sub-electrodes in a direction perpendicular to the array substrate do not go through light-transmissive regions of the sub-pixel units. The common electrode layer is divided to obtain a touch pattern as illustrated in FIG. 2, and is divided to obtain driving sub-electrodes 311 and sensing sub-electrodes 312. One touch pixel 310 is as illustrated in a dashed box, and 311a and 311b respectively represent driving sub-electrodes corresponding to adjacent touch pixels in position. There is a border 800 between the driving sub-electrode 311 and the sensing sub-electrode 312, so that adjacent driving sub-electrode 311 and sensing sub-electrode 312 are insulated from each other. As the driving sub-electrode 311 and the sensing sub-electrode 312 which form a touch unit belong to a common electrode layer 300 in a same film layer, in a touch mode, the driving sub-electrode 311 and the sensing sub-electrode 312 divided from the common electrode layer are coupled to form mutual capacitance, by means of which a touch function is realized. In a display mode, an electrical field parallel to the base substrate 100 is formed between the common electrode layer 300 and the pixel electrode 500, so that the liquid crystal molecules deflect to realize a display function. Thus, the border 800 between the driving sub-electrode and the sensing sub-electrode cannot go through the sub-pixel units, and can only be in a region between adjacent sub-pixel units, namely the border will not go through light-transmissive regions of the sub-pixel units, and therefore will not impact normal display.

As illustrated in FIG. 2, the driving sub-electrode 311 and the sensing sub-electrode 312 are widened in a stepped manner from end portions to a middle portion in the extending direction of the driving electrode and in the extending direction of the sensing electrode. As an entire driving sub-electrode or an entire sensing sub-electrode is not formed in each touch pixel 310, in four touch pixels 310 which are connected to one another as illustrated in FIG. 2, a driving sub-electrode on the right of a touch pixel 301 in the upper left corner and a driving sub-electrode on the left of a touch pixel 310 in the upper right corner form an entire driving sub-electrode; similarly, a sensing sub-electrode on the lower side of a touch pixel 310 in the upper left corner and a sensing sub-electrode on the upper side of a touch pixel 310 in the lower left corner form an entire sensing sub-electrode. It can be seen that any driving sub-electrode 311 or sensing sub-electrode 312 is in a cross-like shape, namely is widened from two end portions to a middle portion in a stepped manner.

Also as illustrated in FIG. 2, the border is located at a region between the sub-pixel units when the common electrode layer 300 is divided. Thus, there is at least one sub-pixel unit at each corner, and there is also at least one sub-pixel unit at a narrowest portion 313 of the sensing sub-electrode 312, so as to ensure that the borders between the driving sub-electrodes and the sensing sub-electrodes do not go through light-transmissive regions of the sub-pixel units.

Figure 3:
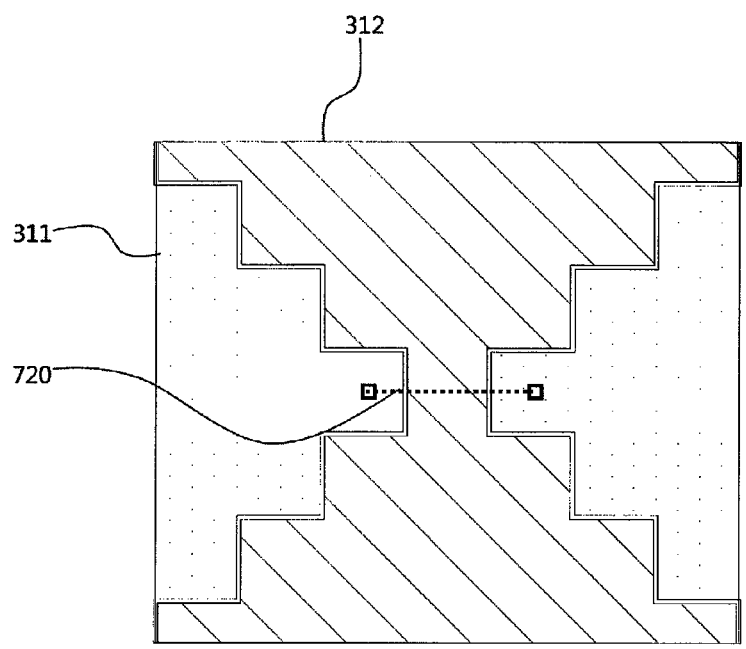
FIG. 3 is a schematic diagram of touch pixels provided by the first embodiment of the invention.
Figure 4:
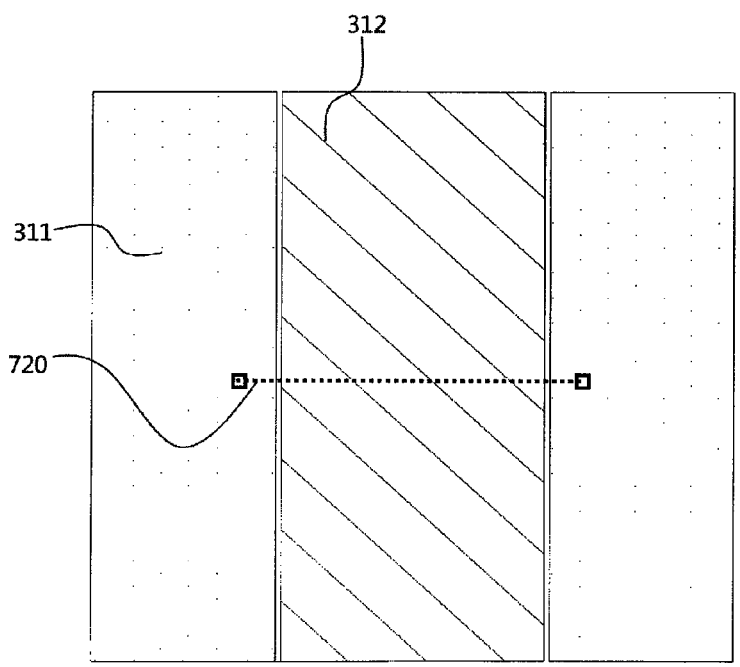
FIG. 4 is a schematic diagram of touch pixels in the prior art.

As the driving sub-electrodes and the sensing sub-electrodes all have coupling capacitance with respect to ground, and these coupling capacitance will impact the mutual capacitance between the driving sub-electrodes and the sensing sub-electrodes in a touch mode, so as to reduce the signal to noise ratio. The stepping structures formed at the borders of the driving sub-electrodes and the sensing sub-electrodes can increase length of boundaries between the driving sub-electrodes and the sensing sub-electrodes. FIG. 3 is a schematic diagram of a touch pixel provided in this embodiment, and FIG. 4 is a schematic diagram of a touch pixel in the prior art. By comparing FIG. 3 with FIG. 4, it is obvious that the length of the boundaries between the driving sub-electrodes and the sensing sub-electrodes provided in this embodiment is longer than that in the prior art without stepping variation. As the mutual capacitance between the driving electrodes and the sensing electrodes is directly proportional to the length of the boundaries between the driving electrodes and the sensing electrodes, increasing the length of the boundaries can increase the mutual capacitance, and therefore increase the signal to noise ratio.

Optionally, with reference to FIG. 2, the driving sub-electrode 311 and the sensing sub-electrode 312 are symmetric to each other both in the extending direction of the driving electrode and in the extending direction of the sensing electrode. Only if each driving sub-electrode and each sensing sub-electrode meet the symmetric relationship, a plurality of driving sub-electrodes can be connected in a first direction to form a driving electrode, and a plurality of sensing sub-electrodes can be connected in a second direction to form a sensing electrode.

For example, as illustrated in FIG. 2, both the driving sub-electrode 311 and the sensing sub-electrode 312 have stepped edges, and an included angle between two side edges of each corner of the stepped edge is, for example, 90 degrees.

Figure 5:
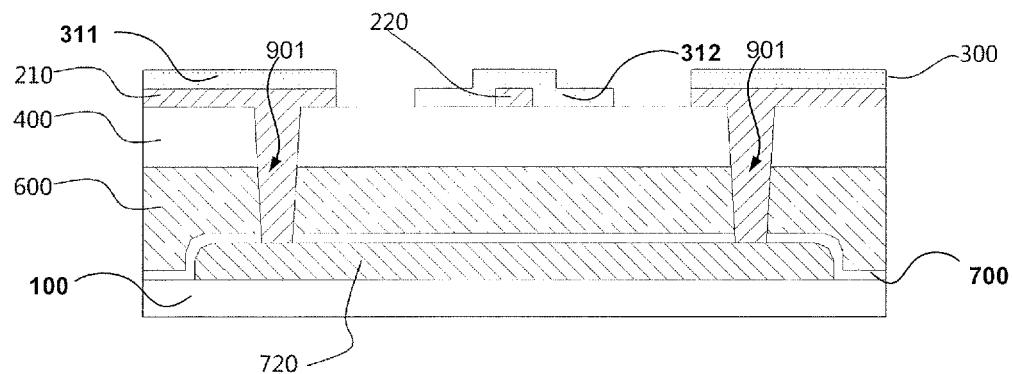
FIG. 5 is a sectional diagram of touch pixels in FIG. 2 or FIG. 3 along A-A'.

Optionally, the base substrate 100 of the array substrate further comprises a gate electrode 710 and bridging metals 720 which are in a same layer as the gate electrode 710 and insulated from the gate electrode 710. The bridging metals 720 and the gate electrode 710 are formed by etching a same layer of metal on the base substrate 100. Therein, adjacent driving sub-electrodes 311 belonging to a same driving electrode are connected with a bridging metal 720 through a via hole 901 so as to be conductive to each other; or adjacent sensing sub-electrodes belonging to a same sensing electrode are connected with a bridging metal through a via hole 901 so as to be conductive to each other. A sectional view of touch pixels in FIG. 2 or FIG. 3 along A-A' is as illustrated in FIG. 5, wherein an upper part of the bridging metal 720 is connected with driving metal wires 210 through the via holes 901, and a driving sub-electrode 311 is arranged above a driving metal wire 210, so that adjacent driving sub-electrodes 311 can be connected electrically through the driving metal wires 210 and the bridging metals 720. It should be noted that the driving sub-electrodes made from transparent conductive materials may also realize an electrical connection between adjacent driving sub-electrodes without the driving metal wires.

It should also be noted that FIGS. 2-4 are all illustrated by taking an example that adjacent driving sub-electrodes 311 are connected by the bridging metal 720. FIG. 5 is illustrated by taking an example that adjacent sensing sub-electrodes are connected directly to form a sensing electrode, and adjacent driving sub-electrodes are indirectly connected through the bridging metal to form a driving electrode. Similarly, adjacent sensing sub-electrodes may be directly connected through the bridging metal to form a sensing electrode, and adjacent driving sub-electrodes may be directly connected to form a driving electrode. The principles are similar, which will not be repeated herein.

Optionally, the array substrate further comprises a metal layer 200, which is located below the common electrode layer 300, and is etched to form driving metal wires 210 and sensing metal wires 220. Each driving metal wire 210 is arranged below each driving sub-electrode 311, and is conductive to the driving sub-electrode 311. Each sensing metal wire 220 is arranged below each sensing sub-electrode 312, and is conductive to the sensing sub-electrode 312. With reference to FIG. 2, driving metal wires are arranged below both of the driving sub-electrodes, and are connected with each other through the bridging metal. A sensing sub-electrode is arranged between two driving sub-electrodes, and is arranged above a sensing metal wire; and the driving sub-electrodes are insulated from the sensing sub-electrode.

Optionally, the array substrate further comprises gate lines and data lines (not illustrated), wherein, the driving metal wires are parallel to the gate lines, and the sensing metal wires are parallel to the data lines; or, the sensing metal wires are parallel to the gate lines, and the driving metal wires are parallel to the data lines.

Figure 6:
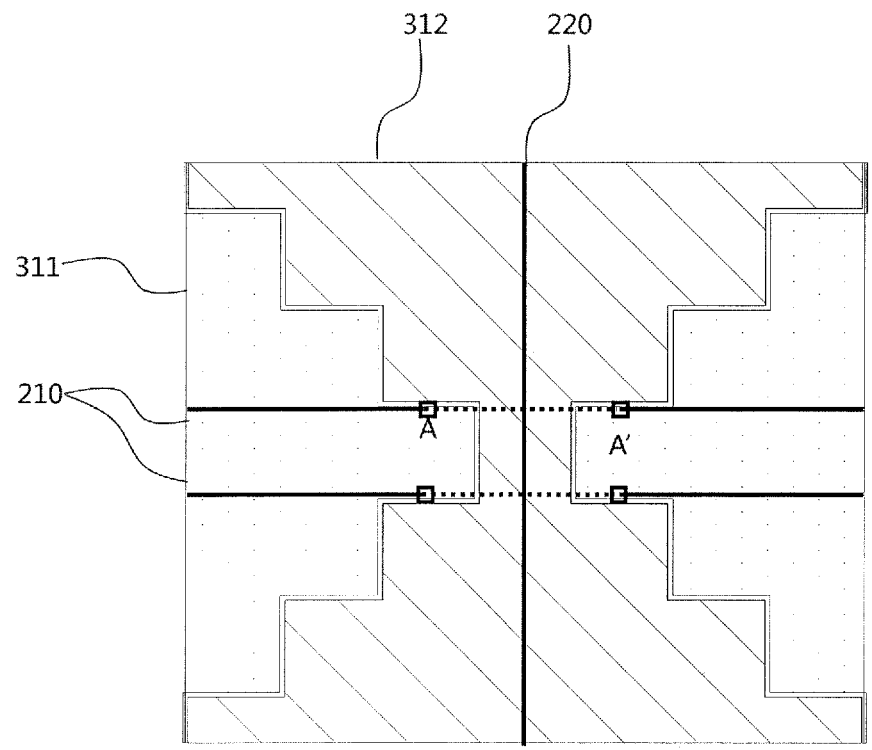
FIG. 6 is a top view of driving metal wires 210 and sensing metal wires in touch pixels according to the first embodiment of the invention.

Therein, one driving electrode is provided with at least one corresponding driving metal wire, and one sensing electrode is provided with at least one corresponding sensing metal wire. A top view of the driving metal wires 210 and the sensing metal wires 220 in touch pixels is as illustrated in FIG. 6. In FIG. 6, one driving electrode is corresponding to two driving metal wires 210, and one sensing electrode is corresponding to one sensing metal wire 220; and FIG. 6 is illustrated by taking an example that the driving metal wires are parallel to the gate lines, and the sensing metal wires are parallel to the data lines.

The driving metal wires 210 are combined with the driving sub-electrodes 311 thereon, so as to reduce resistance of the driving electrodes; similarly, the sensing metal wires 220 are combined with the sensing sub-electrodes 312 thereon, so as to reduce resistance of the sensing electrodes. Thus, the resistance of the driving electrodes and the sensing electrodes can be reduced effectively, and therefore a resistance-capacitance delay can be reduced effectively.

Optionally, an organic film layer 600 may be further arranged on the bridging metals 720. The organic film layer 600 is made from polyimide and acrylic etc., and has properties such as a low dielectric constant, specifically, the dielectric constant ε is lower than 3.5. As commonly used silicon nitride has a dielectric constant ε greater than 6, the dielectric constant ε employed in this embodiment being below 3.5 belongs to a low dielectric constant compared with the dielectric constant ε of 6. The organic film layer 600 of a low dielectric constant can be employed to reduce parasitic capacitance generated on divided driving electrode and sensing electrode by the gate electrode 710 and the thin film transistor thereon.

$$C_j = \varepsilon^* \varepsilon_0 A/d \quad \quad \text{Equation (1)}$$

In Equation (1), ε is a dielectric constant of a medium, and different mediums may have different dielectric constants; $\varepsilon_0$ is a dielectric constant of vacuum, which is a constant value, $\varepsilon_0 = 8.85 \times 10^{-12}$ F/m; A is an effective electrode plate area; d is an electrode plate distance.

According to Equation (1), the parasitic capacitance $C_j$ may be reduced by employing a low dielectric constant ε and a large electrode plate distance (namely film thickness), so as to reduce parasitic capacitance of driving sub-electrodes or sensing sub-electrodes during the touch; namely, the organic film layer which can weaken touch noise can be arranged to reduce the touch noise to a certain extent, so as to achieve the purpose of increasing signal to noise ratio.

In addition, via holes 901 are also formed in positions of the organic film layer 600 corresponding to the bridging metals 720, the bridging metals 720 are conductive to corresponding driving sub-electrodes 311 or sensing sub-electrodes 312 through the via holes; namely, adjacent driving sub-electrodes 311 belonging to a same driving electrode are connected with a bridging metal 720 so as to realize conduction; or adjacent sensing sub-electrodes belonging to a same sensing electrode are connected with a bridging metal through a via hole 901 so as to realize conduction. A sensing sub-electrode 312 is provided with a narrowest portion 313 at a center of a touch pixel 310, and sensing sub-electrodes 312 in each touch pixel 310 are connected to each other through the narrowest portion 313 so as to form a sensing electrode; and driving sub-electrodes 311 on both sides of the sensing sub-electrode 312 in each touch pixel 310 are connected to each other through a bridging metal 720.

It should be noted that adjacent driving sub-electrodes can be directly connected to each other through a bridging metal, and can also be indirectly connected with a bridging metal through driving metal wires. As illustrated in FIG. 1 and FIG. 5, the driving sub-electrode 311 is electrically connected with the bridging metal 720 through the driving metal wire 210.

A via hole 902 is formed in the organic film layer 600 at a position corresponding to the drain electrode, a pixel electrode 500 above the organic film layer 600 is electrically connected with the drain electrode through the via hole 902, and an isolating layer 400 can also be arranged between the organic film layer 600 and the metal wire, so as to keep driving sub-electrodes insulated from sensing sub-electrodes when there is no touch point. The pixel electrode 500 is isolated from the common electrode layer 300 through the isolating layer 400, so that an electrical field parallel to the base substrate can be generated between the pixel electrode 500 and the common electrode layer 300 in the display mode, and therefore liquid crystal molecules deflect in a direction parallel to the base substrate to realize a display function.

It should also be noted that the array substrate as illustrated in FIG. 1 is provided with an insulating layer on a gate electrode 710, and an insulating layer is also arranged above the source electrode 730 and the drain electrode 740, all the above-mentioned insulating layers being represented by an insulating layer 700 in the drawings. When the pixel electrode 500 is electrically connected with the drain electrode 740, in addition to a via hole 902 in the organic film layer 600, there is also a corresponding via hole 902 in the insulating layer; similarly, when the driving metal wire 210 is electrically connected with the bridging metal 720, in addition to via holes 901 in the isolating layer 400 and the organic film layer 600, a via hole 901 is also formed in the insulating layer.

In FIGS. 1-7 of this embodiment, an Advanced Super Dimension Switch (ADSDS, referred to as ADS) mode is taken as an example to describe the above array substrate. The common electrode layer is employed to integrate touch, so as to improve structure of the array substrate and thereby to increase the signal to noise ratio. However, it should be noted that the array substrate can also be applied to a display panel in other mode that common electrode layers and pixel electrodes are located on the side of the array substrate at the same time in addition to an ADS mode.

It should be noted that, according to the embodiment of the invention, the common electrode layer on the array substrate is divided into driving sub-electrodes and sensing sub-electrodes. However, a required pattern, such as a slit pattern, can also be formed at a portion of the common electrode layer corresponding to a light-transmissive region of the sub-pixel units for display as required.

According to the array substrate provided by the invention, the common electrode layer is divided in a certain manner by altering an existing structure of the common electrode layer, concave-convex structures in a staggered arrangement are formed at borders of adjacent driving sub-electrodes and sensing sub-electrodes to form a mutual nest structure, and the driving sub-electrodes and sensing sub-electrodes are insulated from each other at the borders, so as to achieve the purpose of prolonging boundaries between the driving sub-electrodes and the sensing sub-electrodes. Thus, mutual capacitance between the sensing sub-electrodes and the driving sub-electrodes is increased, emission intensity of a touch signal is enhanced, signal to noise ratio of the touch signal is increased, and therefore touch sensitivity is improved. Meanwhile, the organic film layer is arranged below the isolating layer to reduce parasitic capacitance generated at the touch, so as to reduce touch noise, and therefore increase signal to noise ratio. The driving metal wires and the sensing metal wires can be arranged below the driving sub-electrodes and the sensing sub-electrodes which realize touch respectively, which can reduce resistance of the driving electrodes and the sensing electrodes, therefore reducing resistance-capacitance delay effectively.

Second Embodiment

Figure 7:
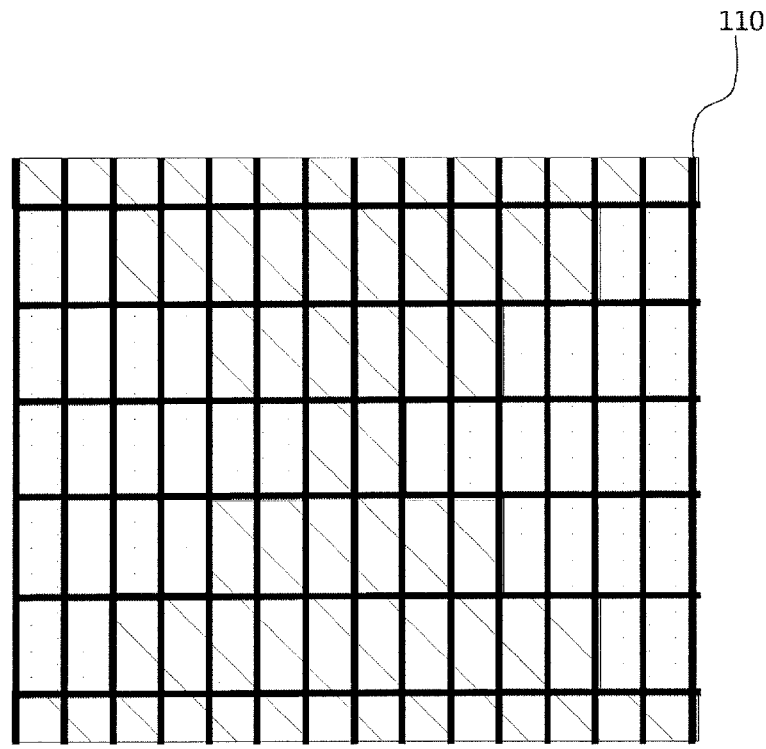
FIG. 7 is a structural schematic diagram of an in-cell touch screen provided by Embodiment Two of the invention.

The second embodiment of the invention provides an in-cell touch screen, as illustrated in FIG. 7. The in-cell touch screen comprises a color filter substrate and the array substrate according to the first embodiment, wherein a black matrix 110 is further arranged between adjacent sub-pixel units on the color filter substrate, the driving metal wires 210, the sensing metal wires 220 as well as the borders 800 between the driving sub-electrodes 311 and the sensing sub-electrodes 312 are all corresponding to the black matrix in position, as illustrated in FIG. 8.

Figure 8:
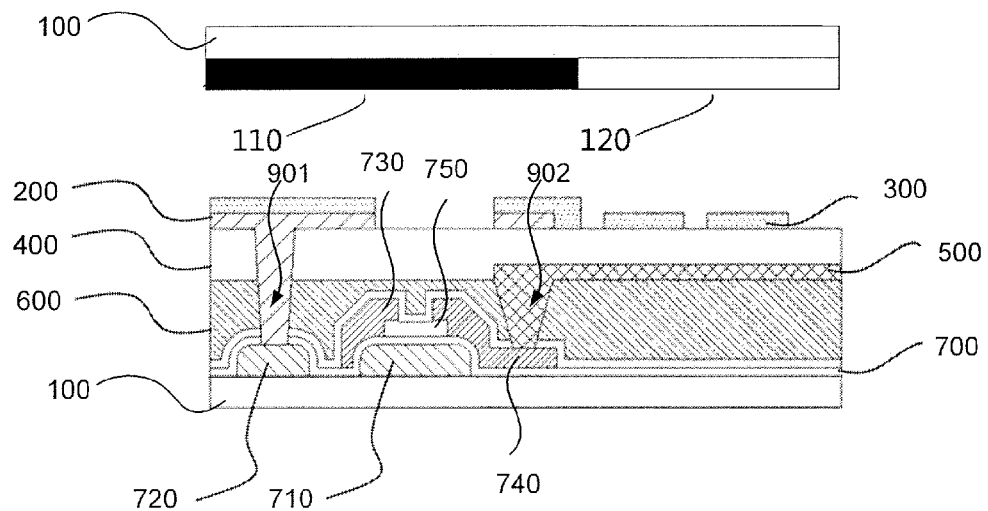
FIG. 8 is a schematic diagram illustrating that borders between the driving sub-electrodes and the sensing sub-electrodes on the array substrate are corresponding to a black matrix on the color filter substrate according to Embodiment Two of the invention.

Therein, the color filter substrate comprises a base substrate 100, a black matrix 110 and a color filter layer 120, and it can be seen from FIG. 8 that the black matrix 110 on the color filter substrate can be corresponding to the border 800 between the a driving sub-electrode and an sensing sub-electrode on the array substrate, and can also be corresponding to a thin film transistor on the array substrate in position. Thus, the purpose of increasing signal to noise ratio is achieved provided that normal display is not impacted.

Third Embodiment

The third embodiment of the invention further provides a touch display device, comprising the in-cell touch screen according to the second embodiment, which increases signal to noise ratio while realizing a touch and display function.

The touch display device provided in this embodiment may be electronic paper, a cell phone, a tablet computer, a TV set, a laptop, a digital photo frame, a navigator or any product or component with a display function.

The above embodiments are only related to the description of the invention and thus are not limitative of the invention. Those of ordinary skill in the art may obtain other various variations and changes, without departing from the scope and spirit of the invention, which should be within the scope of the invention, and the scope of the invention should be defined by the appended claims.

The foregoing embodiments merely are exemplary embodiments of the invention, and not intended to define the scope of the invention, and the scope of the invention is determined by the appended claims.

The present application claims priority of Chinese Patent Application No. 201410472784.8 filed on Sep. 16, 2014, the disclosure of which is incorporated herein by reference in its entirety as part of the present application.

What is claimed is:

1. An array substrate, comprising a common electrode layer, wherein the common electrode layer is provided with a plurality of driving electrodes and a plurality of sensing electrodes with extending directions perpendicular to each other, each of the driving electrodes includes a plurality of driving sub-electrodes which are connected to one another, each of the sensing electrodes includes a plurality of sensing sub-electrodes which are connected to one another, and adjacent driving sub-electrodes and sensing sub-electrodes have concave-convex structures in a staggered arrangement at borders and are insulated from each other, the array substrate further comprises:
a bridging metal, wherein an organic film layer is further arranged on the bridging metal, via holes are further formed in positions of the organic film layer corresponding to the bridging metal;
driving metal wires and sensing metal wires formed by etching a metal layer located below the common electrode layer, the driving metal wires being arranged below the driving sub-electrodes and being conductive to the driving sub-electrodes, and the sensing metal wires being arranged below the sensing sub-electrodes and being conductive to the sensing sub-electrodes, one driving electrode being corresponding to two driving metal wires, and one sensing electrode being corresponding to one sensing metal wire; and
an isolating layer disposed between the organic film layer and each of the driving metal wires and sensing metal wires,
wherein the bridging metal is connected with the driving metal wires or the sensing metal wires through the via holes so as to be conductive to corresponding driving sub-electrodes or sensing sub-electrodes through the via holes, and
wherein the organic film layer is made of a material having a dielectric constant ε lower than 3.5.

2. The array substrate according to claim 1, further comprising a plurality of sub-pixel units, wherein projections of the borders of the driving sub-electrodes and the sensing sub-electrodes in a direction perpendicular to the array substrate do not go through light-transmissive regions of the sub-pixel units.

3. The array substrate according to claim 1, wherein the driving sub-electrode and the sensing sub-electrode are both widened in a stepped manner from end portions to a middle portion in the extending direction of the driving electrode and in the extending direction of the sensing electrode.

4. The array substrate according to claim 1, wherein the driving sub-electrode and the sensing sub-electrode have serrated edges, and adjacent serrated edges of the driving sub-electrode and the sensing sub-electrode are arranged in a staggered manner.

5. The array substrate according to claim 1, wherein the driving sub-electrode and the sensing sub-electrode are symmetric to each other both in the extending direction of the driving electrode and in the extending direction of the sensing electrode.

6. The array substrate according to claim 1, further comprising a gate electrode which is in a same layer as the bridging metal and insulated from the bridging metal, wherein,
adjacent driving sub-electrodes belonging to a same driving electrode are connected with the bridging metal so as to be conductive to each other; or
adjacent sensing sub-electrodes belonging to a same sensing electrode are connected with the bridging metal so as to be conductive to each other.

7. The array substrate according to claim 1, further comprising gate lines and data lines, wherein,
the driving metal wires are parallel to the gate lines, and the sensing metal wires are parallel to the data lines; or
the sensing metal wires are parallel to the gate lines, and the driving metal wires are parallel to the data lines.

8. An in-cell touch screen, comprising a color filter substrate and the array substrate according to claim 1, wherein a black matrix is further arranged between adjacent sub-pixel units on the color filter substrate, the driving metal wires and the sensing metal wires on the array substrate as well as the borders between the driving sub-electrodes and the sensing sub-electrodes are all corresponding to the black matrix in position.

9. A touch display device, comprising the in-cell touch screen according to claim 8.

10. The array substrate according to claim 2, wherein the driving sub-electrode and the sensing sub-electrode are both widened in a stepped manner from end portions to a middle portion in the extending direction of the driving electrode and in the extending direction of the sensing electrode.

11. The array substrate according to claim 2, wherein the driving sub-electrode and the sensing sub-electrode have serrated edges, and adjacent serrated edges of the driving sub-electrode and the sensing sub-electrode are arranged in a staggered manner.

12. The array substrate according to claim 2, wherein the driving sub-electrode and the sensing sub-electrode are symmetric to each other both in the extending direction of the driving electrode and in the extending direction of the sensing electrode.

13. The array substrate according to claim 2, further comprising a gate electrode which is in a same layer as the bridging metal and insulated from the bridging metal, wherein,
- adjacent driving sub-electrodes belonging to a same driving electrode are connected with the bridging metal so as to be conductive to each other; or
- adjacent sensing sub-electrodes belonging to a same sensing electrode are connected with the bridging metal so as to be conductive to each other.

14. The in-cell touch screen according to claim 8, further comprising a plurality of sub-pixel units, wherein projections of the borders of the driving sub-electrodes and the sensing sub-electrodes in a direction perpendicular to the array substrate do not go through light-transmissive regions of the sub-pixel units.

15. The in-cell touch screen according to claim 8, wherein the driving sub-electrode and the sensing sub-electrode are both widened in a stepped manner from end portions to a middle portion in the extending direction of the driving electrode and in the extending direction of the sensing electrode.

16. The in-cell touch screen according to claim 8, wherein the driving sub-electrode and the sensing sub-electrode have serrated edges, and adjacent serrated edges of the driving sub-electrode and the sensing sub-electrode are arranged in a staggered manner.

17. The in-cell touch screen according to claim 8, wherein the driving sub-electrode and the sensing sub-electrode are symmetric to each other both in the extending direction of the driving electrode and in the extending direction of the sensing electrode.

* * * * *